(12) United States Patent
Mayer et al.

(10) Patent No.: US 8,027,829 B2
(45) Date of Patent: Sep. 27, 2011

(54) SYSTEM AND METHOD FOR INTEGRATED CIRCUIT EMULATION

(75) Inventors: Albrecht Mayer, Deisenhofen (DE); Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 421 days.

(21) Appl. No.: 12/039,258

(22) Filed: Feb. 28, 2008

(65) Prior Publication Data

US 2009/0222254 A1      Sep. 3, 2009

(51) Int. Cl.
*G06F 9/445* (2006.01)
*G06F 3/00* (2006.01)
*G06F 11/36* (2006.01)

(52) U.S. Cl. ............... 703/27; 703/14; 703/17; 703/28; 716/4; 716/18; 717/4

(58) Field of Classification Search ............... 703/2, 14, 703/17, 27, 28; 716/4, 18; 717/4
See application file for complete search history.

(56) References Cited

U.S. PATENT DOCUMENTS

| | | | | |
|---|---|---|---|---|
| 4,751,635 A | * | 6/1988 | Kret | 1/1 |
| 5,838,949 A | * | 11/1998 | Hassoun | 703/13 |
| 6,314,529 B1 | | 11/2001 | Rana | |
| 6,556,952 B1 | * | 4/2003 | Magro | 702/183 |
| 7,536,462 B2 | * | 5/2009 | Pandya | 709/227 |
| 2004/0030770 A1 | * | 2/2004 | Pandya | 709/223 |
| 2005/0240745 A1 | * | 10/2005 | Iyer et al. | 711/167 |
| 2005/0289399 A1 | | 12/2005 | Kimura | |
| 2008/0092092 A1 | * | 4/2008 | Dalton et al. | 716/4 |

* cited by examiner

*Primary Examiner* — Thai Phan
(74) *Attorney, Agent, or Firm* — Dicke, Billig & Czaja, PLLC

(57) ABSTRACT

A system and method for integrated circuit emulation. One embodiment provides a system for in-circuit emulation of an integrated circuit device with program-controlled components. The system includes an integrated circuit device with program-controlled components used in a system for normal operation. The integrated circuit device having at least one program-controlled emulation unit emulating at least one of the program-controlled components of the integrated circuit device, and at least one statistics memory for storing statistical data of the program-controlled emulation unit during emulation.

23 Claims, 1 Drawing Sheet

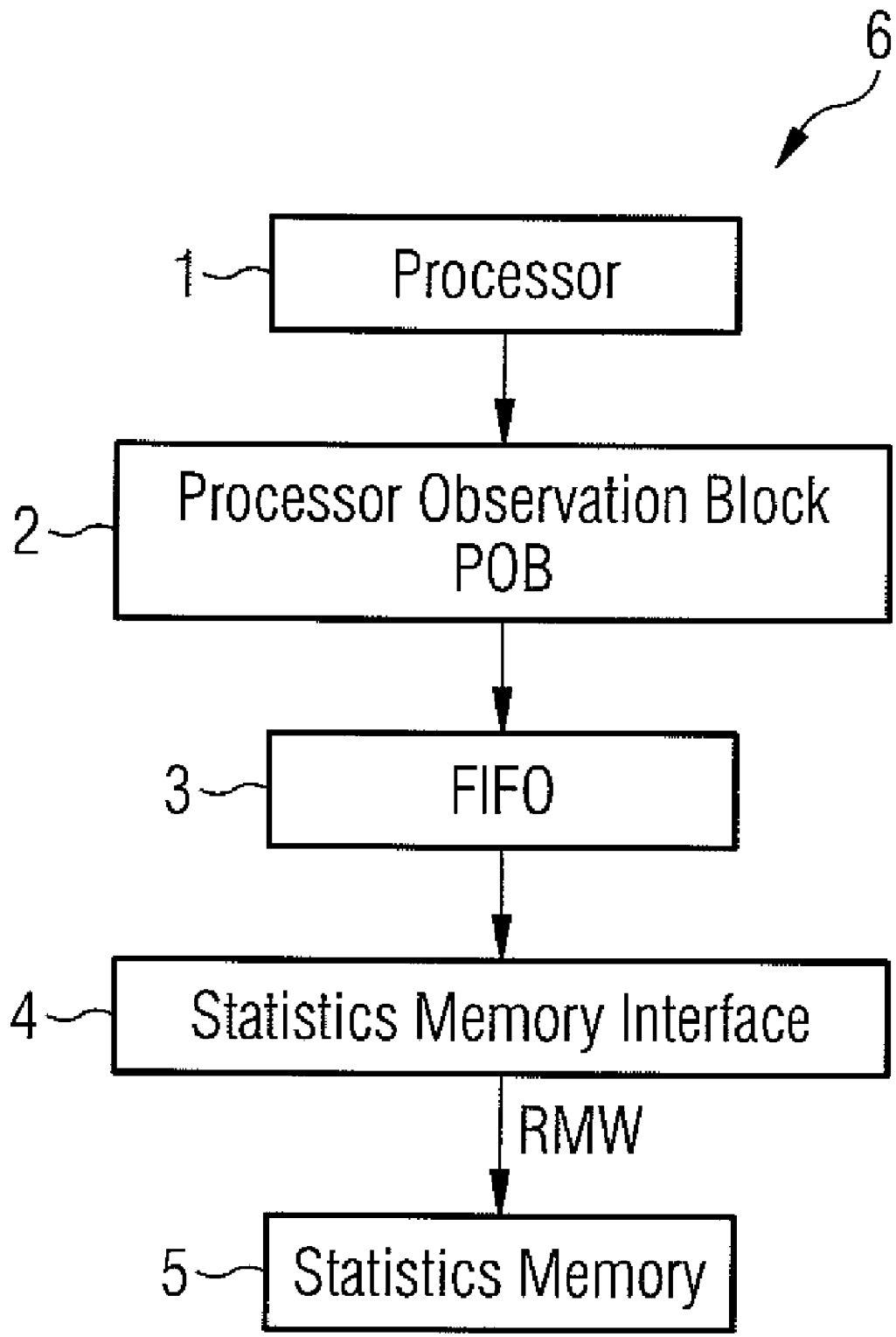

SYSTEM AND METHOD FOR INTEGRATED CIRCUIT EMULATION

BACKGROUND

The present invention relates to a system for profiling and coverage analysis of integrated circuits devices. The present invention is further related to a system for in-circuit emulation of program-controlled units, such as microprocessors, microcontrollers or signal processors.

In-circuit emulation of a program-controlled unit allows the states existing and operations taking place in the program-controlled unit to be tracked and altered during operation of the system that contains the program-controlled unit. In-circuit emulation makes it possible to read, output or alter contents of internal registers or memories in the program-controlled unit and, to output data or signals transferred within the program-controlled unit from the program-controlled unit (trace data). During the emulation, commands which need to be executed and/or operands which are used by the program-controlled unit may be fetched from a different memory than is normally the case, and/or the program executed by the program-controlled unit may be interrupted.

These and other actions can be made dependent on the presence of particular conditions, e.g., on the arrival at a particular value of a program counter. Emulation allows errors occurring in the system that contains the program-controlled unit to be localized and corrected during operation of the system and allows the response of the system to be tested when executing new or modified programs.

A program-controlled unit used in normal operation of a system can usually not be operated such that the states existing and operations taking place therein can be tracked and altered during operation, since it does not contain the components required for this, due to space and cost saving reasons. In-circuit emulation is therefore usually performed using a special version of the respective program-controlled unit also known as program-controlled unit emulation version or "bond-out" version of the program-controlled unit.

A general challenge of program-controlled units is that it is often not possible to localize and eliminate occurring errors in the program-controlled unit. For this reason, emulation versions of program-controlled units need to be equipped with debug resources that can monitor the operations proceeding within the program-controlled unit. Such and other debug resources make it possible to monitor the occurrence of states or events within the program-controlled unit, which states or events can be prescribed from outside the program-controlled unit, and, when such a state or such an event has occurred, to carry out or instigate actions which can be prescribed from outside the program-controlled unit.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a schematic illustration of a system for profiling and coverage analysis of integrated circuit semiconductor devices and/or program-controlled units according to one embodiment. The configuration according to one embodiment illustrated in FIG. 1 provides an in-circuit emulation of an integrated circuit device with program-controlled components.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As the manufacturing of an emulation version or bond-out version of the program-controlled unit is costly, it is desirable to use a standard version of the program-controlled unit for emulation testing. The present embodiments provide the possibility to use a standard version of an integrated circuit device or program-controlled unit for emulation tests of the integrated circuit device or program-controlled unit.

One or more embodiments provide an emulation strategy based on standard versions of integrated circuit devices or program-controlled units. Nevertheless, the present embodiments can also be applied to emulation versions of circuit devices with program-controlled components used for replacing, during emulation, the standard version of integrated circuit device used in normal operation of a system containing the integrated circuit device.

An important measurement for performance improvement and quality assurance of program-controlled units, such as integrated circuit semiconductor devices, central processing units (CPU), high-speed cores, microcontrollers, microprocessors or signal processors, is the profiling and coverage analysis. One of the most common profiling analysis approach is to measure the fraction of the overall execution time for all functions of the devices. One of the most common coverage analysis approach is to analyze which instructions of the software have been executed by the integrated circuit device, and in one embodiment which instructions of the software have not been executed by the semiconductor device.

The profiling and coverage analysis of program-controlled units or integrated circuit semiconductor devices may be performed by recording of long program traces (e.g., with a Nexus trace interface) using a so called trace box. The trace box has a memory in the range of Gigabytes and performs a time stamping of the recorded trace messages. However, this known solution requires a trace interface, which might not be available at the latest generation of semiconductor devices due to the costs of the necessary high frequency trace pins.

When the program memory is outside of the bond-out version of the program-controlled unit under consideration, coverage analysis may be performed by writing the observed program addresses into a special bit memory. For initializing this memory all bits were set to 0 and after the test all executed instruction addresses were tagged, i.e. set to 1 in the memory. However, this approach is not possible with the latest program-controlled units anymore for two reasons. Firstly, the program memory is arranged on-chip (e.g., flash memory) and bond-out versions of modern program-controlled units may not be available anymore. Secondly, the frequency of high-end microcontroller cores has increased much faster than the access speed of memories. Therefore, the approach is not possible anymore for a fast (multi-scalar) microcontroller or central processing unit (CPU).

One or more embodiments provide an improved high-end microcontroller emulation strategy based on standard versions of integrated circuit devices or program-controlled units. One embodiment is based on an integrated circuit device with program-controlled components used in a system for normal operation, wherein the integrated circuit device is having at least one program-controlled emulation unit emulating at least one of the program-controlled components of the integrated circuit device.

Conventional emulation or bond-out devices contain a so called trigger and trace logic and a trace memory, e.g., with 256 kByte capacity. Thus, there is sufficient memory provided close to an instruction pointer (IP) observation unit. According to one embodiment, the integrated circuit device or program-controlled unit is equipped with at least one memory that stores statistical profiling or coverage data of the analyzed program-controlled emulation unit during emulation, thereby providing a memory for the statistics. According to one embodiment, instead of conventional recording traces, the memory stores statistical profiling or coverage data and may therefore be defined as "statistics memory".

Furthermore, one embodiment proposes to perform profiling and coverage analysis of program-controlled units or integrated circuit devices with direct tagging and/or accumulation of statistics referring to profiling or coverage data. This means, with reference to coverage data, the memory stores and contains the instruction addresses tagging information. Thus, the approach of the present invention can be used to overcome the above mentioned CPU frequency challenge. In the present context, the term "tagging" means specifying a certain base address associated with a certain address range or memory section. The tagging can be done, for instance, by respective setting of the tag register which is adapted to store program instruction addresses and/or base addresses.

One embodiment is to decouple the collection of statistics data generated by the program-controlled emulation unit during emulation from the statistics memory. Thus, profiling and coverage analysis can be performed also for very fast integrated circuit devices or program-controlled units, such as (multi-scalar) processor cores with high CPU frequencies.

According to one embodiment, a configuration for profiling and coverage analysis of program-controlled units or integrated circuit semiconductor devices is provided, wherein the architecture of the configuration includes a processor observation block which collects statistical data according to predetermined rules applied to several clock cycles. The processor observation block may be adapted to evaluate profiling data and/or trace data generated in the program-controlled emulation unit during the emulation process. Furthermore, the processor observation block may be adapted to calculate statistical profiling data, trace data and/or coverage data generated in the program-controlled emulation unit during emulation.

According to one embodiment, an average of the statistical data can be determined over several clock cycles, e.g., in the order of magnitude 10. The statistical data may be sent via a first-in-first-out-memory (FIFO) to a statistics memory interface, which may combine the new data with the already existing data in the statistics memory. The combination of new data with the already existing data in the statistics memory may be performed in a Read Modify Write access (RMW) of the statistics memory interface.

According to one embodiment, a first-in-first-out-memory may be provided between the processor observation block and the statistics memory interface to buffer peaks of statistics data of code sequences with a lot of branches. Furthermore, the processor observation block may have more than one tag register. The content of the plurality of tag registers may be written back to the statistics memory according to more sophisticated rules. These rules may be similar to cache memory rules, since the tag register can be considered to represent a cache line. Furthermore, the tag register width may be aligned with the cache line size, since the CPU can only run fast, when it runs out of cache. Thus, there can be sufficient time provided to write back the tag register, in case a cache line needs to be replaced.

According to one embodiment, to install a simple Read Modify Write interface to the statistics memory, there may be more or less strict alignment rules provided for the processor observation block base addresses. If completeness of the analysis shall have priority over resolution, the granularity of the instruction address may be increased, wherein one bit may be provided for a potentially number or several instructions. In one embodiment, not all possible instruction addresses may be mapped to the statistics memory. In one embodiment a configuration register may be provided in the statistics memory interface, which may increase resolution of the analysis.

For providing a profiling analysis of integrated circuit semiconductor devices the present invention uses the same above mentioned principle. For this purpose, according to one embodiment, the processor observation block may be provided with a local counter or saturation counter which counts the clock cycles, when the instruction pointer is in a specific address range. This address range of the instruction pointer may be adapted to cover several instructions or a predetermined number of instructions. For instance, the address range of the instruction pointer may be adapted to cover instructions according to the following equation:

$$\text{address range} = \log_2(\text{maximum count})$$

wherein the term "address range" represents the address range of the instruction pointer adapted to cover a number of instructions, and the term "maximum count" represents the maximum count of clock cycles. The clock cycles are counted by a counter value, which may be stored in the tag register.

According to one embodiment, when the instruction pointer is outside of the predetermined address range, the counter value and the associated base address may be transmitted from the tag register to the statistics memory interface. The transferring of the counter value and the associated base address to the statistics memory interface may be performed via the first-in-first-out-memory between the processor observation block and the statistics memory interface. Subsequently, the statistics memory interface may perform a Read Modify Write to add (as a saturation adder) the counter value to the data which represents the instruction pointer address range in the statistics memory.

One embodiment illustrated in FIG. 1 is based on an integrated circuit device with program-controlled components used in a system for normal operation. Nevertheless, the present embodiment can also be applied to emulation versions of circuit devices with program-controlled components used for replacing, during emulation, the standard version of integrated circuit device used in normal operation of a system containing the integrated circuit device.

The integrated circuit device according to one embodiment, includes a program-controlled emulation unit 6 emulating at least one of the program-controlled components of the integrated circuit device. Hence, this program-controlled unit 6 is part of the integrated circuit device used in normal operation of a system and emulates at least one of the program-controlled components of the integrated circuit device to be analyzed. Therefore, the program-controlled emulation unit is adapted to execute, during emulation, a program which is normally executed by the emulated program-controlled component during normal operation of the integrated circuit device to be analyzed. The program-controlled unit of the emulation device may be a processor, high-speed core, microprocessor, microcontroller, signal processor or central processing unit (CPU) 1.

The integrated circuit device according to one embodiment, includes a statistics memory 5 for storing statistical data of the program-controlled emulation unit during emulation. According to the embodiment illustrated in FIG. 1, a configuration for profiling and coverage analysis of program-controlled units may include a processor or CPU 1 of the program-controlled unit to be analyzed, a processor observation block (POB) 2, a first-in-first-out-memory (FIFO) 3, a statistics memory interface 4 and a statistics memory 5.

The processor observation block 2 may be provided with an 32 bit wide tag register. The 32 bit of the tag register may represent 32 instruction addresses after a base address. An instruction address may be an address with a granularity determined by the smallest instruction word of the processor architecture of the program-controlled unit or integrated circuit device under analysis. In the present context the term granularity refers to the level of detail of the program code under consideration and indicates the size of the smallest elements in the program code. If the processor 1 (CPU) of the analyzed program-controlled unit executes a sequential program code, the processor observation block 2 may set the 32 bits of the tag register sequentially to 1. The instructions may be larger than the granularity of the instruction address so that several bits of the tag register may be set concurrently.

If the instruction pointer (not illustrated) leaves the address range of the tag register (linearly or by branch), the processor observation block 2 may send the tag register with the associated base address to the statistics memory 5 via the first-in-first-out-memory 3 and the statistics memory interface 4. Subsequently, the processor observation block 2 may set the next base address in the tag register and initialize the tag register again. This can be done by so called "carry bits" from a long instruction already executed. The statistics memory interface 4 may then translate the base address into an offset stored in the physical statistics memory 5, do a Read Modify Write (RMW) to avoid that already set tag bits in the statistics memory 5 are overwritten with 0. This last process might not be necessary, if the tag register is completely set to 1.

The tag register can be used to specify a certain address range for the instruction pointer, e.g., the content of the tag register may be associated or correspond to a certain address range of a memory. The time the instruction pointer is within the specified address range can be measured by counting the respective clock cycles as along as the instruction pointer is within the address range.

According to one embodiment, a first tag register and a second tag register can be provided. If the instruction pointer leaves a first address range or memory section with addresses associated with the base address of the first tag register and runs into a second address range or memory section, the second tag register may be set to a second base address specifying the second address range or memory section. Thus, it can be avoided to delete the setting of the first tag register, since the second base address specifying the second address range is stored in the second tag register. For instance, the leaving of the instruction pointer out of a first address range can be caused by the execution of an instruction extending over the boundary between a first address range and a second address range. Thereby, it can be avoided that the tag register is repeatedly set to a first base address. If, however, the instruction pointer leaves the second address range runs into a third address range different from the first and the second address range, the first tag register may be set to a third base address specifying the third address range or memory section for the instruction pointer.

In compliance therewith, a first local counter or saturation counter and a second local counter or saturation counter can be provided for counting clock cycles, respectively. The first local counter may count the clock cycles as long as the instruction pointer is within a first address range or memory section with addresses associated with the base address stored in the first tag register, and the second local counter may count the clock cycles as long as the instruction pointer is within the second address range or memory section with addresses associated with the base address stored in the second tag register.

With reference to the application example illustrated in FIG. 1, the approach of the present invention may provide the effect that it takes in this case up to 32 CPU cycles until a Read Modify Write (RMW) to the statistics memory 5 was required. Even if the analyzed processor or CPU 1 is multiple-issue with differently sized instructions, several clock cycles will be needed to execute the equivalent of one tag word. Thereby, the statistics memory access can be significantly slower than the CPU. Thus, the present invention can make it feasible to perform profiling and coverage analysis for fast integrated circuit devices with high CPU frequencies, too.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for in-circuit emulation of an integrated circuit device with program-controlled components, the system comprising:
   an integrated circuit device with program-controlled components used in a system for normal operation;
   the integrated circuit device having at least one program-controlled emulation unit emulating at least one of the program-controlled components of the integrated circuit device; and
   a processor observation block comprising a counter with a counter value to count a number of clock cycles an instruction pointer is within a predetermined address range, to collect statistical data of the program-controlled emulation unit and send the statistical data comprising the counter value to at least one statistics memory for storing the statistical data in the statistics memory.

2. The system of claim 1, wherein the system is configured to decouple collection of statistical data generated by the program-controlled emulation unit during emulation from the statistics memory.

3. The system of claim 1, wherein the system is configured to perform collection of statistical data generated by the program-controlled emulation unit during emulation in accordance with predetermined rules referring to a number of clock cycles.

4. The system of claim 1, wherein the statistics memory is configured to store profiling data, trace data and/or coverage data generated by the program-controlled emulation unit during emulation.

5. The system of claim 1, wherein the program-controlled emulation unit is configured to execute, during emulation, a program which is normally executed by the emulated program-controlled component during normal operation of the integrated circuit device.

6. A system comprising:
an integrated circuit device with program-controlled components used in a system for normal operation;
the integrated circuit device having at least one program-controlled emulation unit emulating at least one of the program-controlled components of the integrated circuit device;
at least one statistics memory for storing statistical data of the program-controlled emulation unit during emulation; and
a processor observation block configured to control and/or monitor the emulation, the processor observation block comprising a counter with a counter value to count a number of clock cycles an instruction pointer is within a predetermined address range, to collect the statistical data of the program-controlled emulation unit and send the statistical data comprising the counter value to the at least one statistics memory for storing the statistical data in the statistics memory.

7. The system of claim 6, wherein the processor observation block is configured to evaluate profiling data and/or trace data generated in the program-controlled emulation unit during emulation.

8. The system of claim 6, wherein the processor observation block is configured to calculate statistical profiling data, trace data and/or coverage data generated in the program-controlled emulation unit during emulation.

9. The system of claim 6, wherein the processor observation block is provided with a tag register configured to store program instruction addresses and/or base addresses.

10. The system of claim 9, wherein the tag register is configured to store a counter value of clock cycles, profiling data, trace data and/or coverage data of the program-controlled emulation unit during emulation.

11. The system of claim 9, wherein the tag register is configured to transfer statistical profiling data, trace data and/or coverage data generated by the program-controlled emulation unit during emulation to the statistics memory, if the clock cycle counter has reached a predetermined value.

12. The system of claim 9, wherein the processor observation block is configured to prompt a transfer of content from the tag register to the statistics memory, if the clock cycle counter has reached a predetermined value.

13. The system of claim 9, wherein the processor observation block is configured to set a number of bits of the tag register concurrently.

14. The system of claim 9, wherein the processor observation block is configured to transfer content of the tag register to the statistics memory, if the instruction pointer is outside of an address range of the tag register.

15. The system of claim 9, wherein the processor observation block is configured to transfer a clock cycle counter value and an associated base address from the tag register to the statistics memory.

16. The system of claim 6, wherein, if the program-controlled unit executes a sequential program code, the processor observation block is configured to set the bits of the tag register sequentially.

17. The system of claim 6, wherein the system is configured to perform profiling and coverage analysis of the program-controlled emulation unit with direct tagging and/or accumulation of statistics referring to profiling or coverage data, and the statistics memory stores the instruction addresses tagging information.

18. The system of claim 6, comprising:
a first tag register; and
a second tag register,
wherein, if the instruction pointer leaves a first base address associated with the first tag register and runs into a second address range or memory section, the second tag register is configured to store to a second base address specifying the second address range or memory section;
wherein, if the instruction pointer leaves the second address range runs into a third address range different from the first and the second address range, the first tag is configured to store a third base address specifying the third address range; and
wherein the statistics memory interface is configured to combine new statistical data generated by the program-controlled emulation unit during emulation with already existing data in the statistics memory.

19. The system of claim 18, comprising:
a second local counter,
wherein the counter is configured to count the clock cycles as long as the instruction pointer is within a first address range or memory section with addresses associated with the base address of the first tag register, and the second local counter is configured to count the clock cycles as long as the instruction pointer is within the second address range or memory section with addresses associated with the base address of the second tag register; and
wherein, if the instruction pointer is outside of the predetermined address range, the counter value and an associated base address is transferred from the tag register to the statistics memory interface.

20. The system of claim 9, wherein the processor observation block is configured to set a base address in the tag register and initialize the tag register after transferring content of the tag register to the statistics memory;
wherein the content of the tag register is transferred to the statistics memory via a first-in-first-out-memory and a statistics memory interface;
wherein the first-in-first-out-memory is provided between the processor observation block and the statistics memory interface to buffer peaks of statistics data and/or of code sequences;
wherein the statistics memory interface is configured to translate the base address into an offset stored in the statistics memory; and wherein the processor observation block is configured to prompt the statistics memory interface to translate the base address to an offset into the statistics memory and to perform a Read Modify Write access to the statistics memory to avoid that already set tag bits in the statistics memory are overwritten.

21. An apparatus for in-circuit emulation of an integrated circuit device with program-controlled components, the apparatus comprising:
   an integrated circuit device with program-controlled components used in a system for normal operation;
   the integrated circuit device having at least one program-controlled emulation unit emulating at least one of the program-controlled components of the integrated circuit device; and
   a processor observation block comprising a counter with a counter value to count a number of clock cycles an instruction pointer is within a predetermined address range, to collect statistical data of the program-controlled emulation unit and send the statistical data comprising the counter value to at least one statistics memory for storing the statistical data in the statistics memory.

22. A method for in-circuit emulation of an integrated circuit device with program-controlled components, the method comprising:
   using an integrated circuit device with program-controlled components used in normal operation of a system containing the integrated circuit device;
   the integrated circuit device having at least one program-controlled emulation unit emulating at least one of the program-controlled components of the integrated circuit device;
   performing an emulation with the at least one program-controlled emulation unit;
   collecting statistical data of the program-controlled emulation unit comprising counting a number of clock cycles an instruction pointer is within a predetermined address range; and
   sending the statistical data comprising the count of clock cycles to at least one statistics memory for storing the statistical data in the statistics memory.

23. A system comprising:
   an integrated circuit device with program-controlled components used in a system for normal operation;
   means for emulating at least one of the program-controlled components of the integrated circuit device; and
   means for collecting statistical data of the means for emulating comprising a counter with a counter value to count a number of clock cycles an instruction pointer is within a predetermined address range and sending the statistical data comprising the counter value to statistics memory means for storing the statistical data in the statistics memory means.

* * * * *